UNITED STATES PATENT OFFICE.

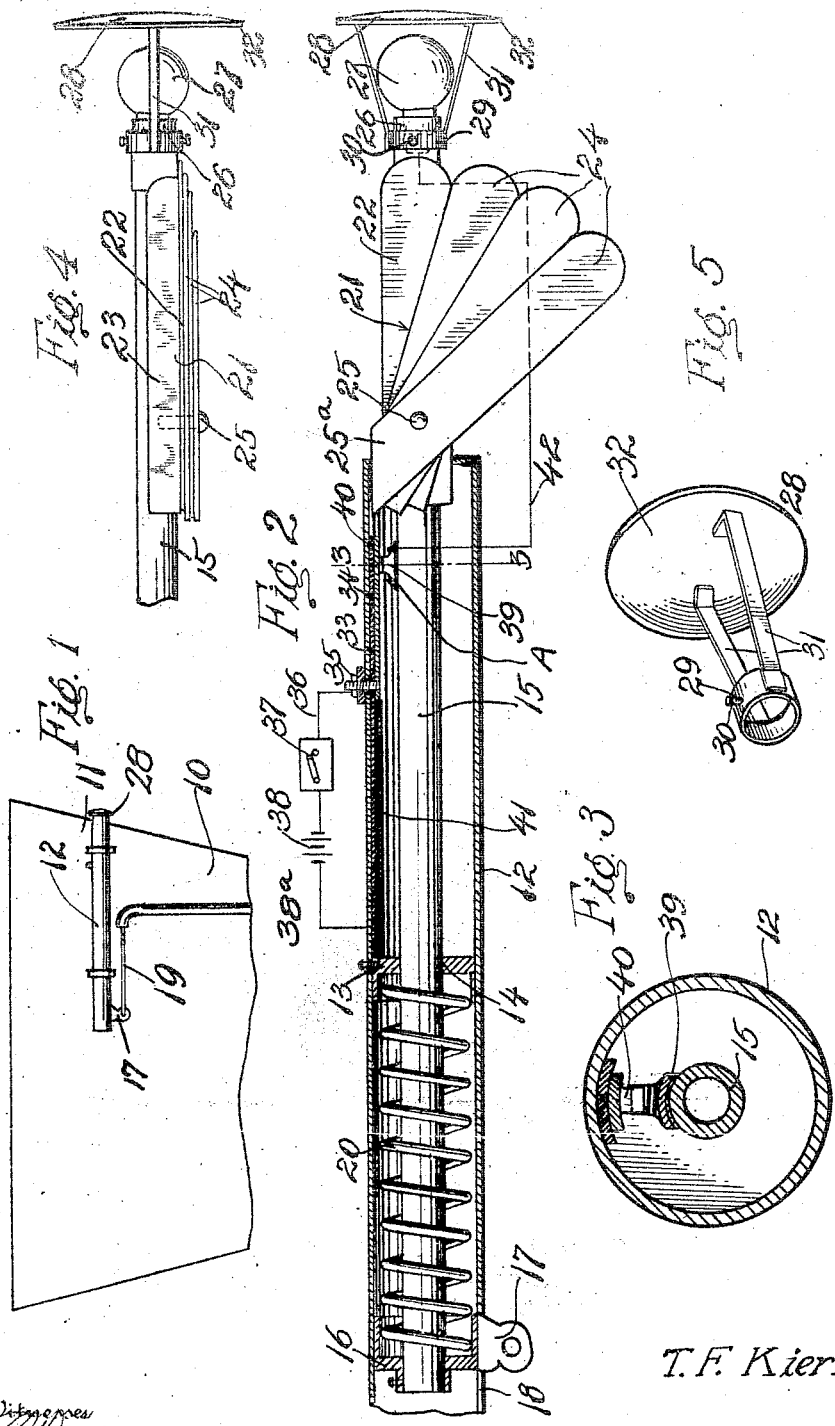

THOMAS F. KIERNAN, OF SALIDA, CALIFORNIA.

DIRECTION-INDICATOR FOR AUTOMOBILES.

1,305,609.  Specification of Letters Patent.  Patented June 3, 1919.

Application filed June 12, 1917. Serial No. 174,293.

*To all whom it may concern:*

Be it known that I, THOMAS F. KIERNAN, a citizen of the United States, residing at Salida, in the county of Stanislaus, State of California, have invented certain new and useful Improvements in Direction-Indicators for Automobiles; and I do hereby declare the following to be a full, clear, and exact description of the invention, such as will enable others skilled in the art to which it appertains to make and use the same.

This invention is an improvement in signals and has particular reference to a direction indicator for vehicles.

An object of the invention is to provide a device of this character to be mounted preferably at the rear of an automobile or other vehicle and operated from the driver's seat to indicate and give ample warning, to the drivers of rear or approaching vehicles, of a change in the course or management of the vehicle so that collisions may be avoided and, to this end, use is made of a cylinder in which a tubular lamp and indicator carrying member is slidably mounted and operated from the driver's seat so that the indicator will be projected from the end of the cylinder and the lamp carried by the tubular member automatically lighted.

Another object is to provide a signal which is simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is a fragmentary rear elevation of the automobile partly broken away and showing the signal in side elevation.

Fig. 2 is a longitudinal section of the signal in operative position.

Fig. 3 is a transverse section on the line 3—3 of Fig. 2.

Fig. 4 is a fragmentary top plan view taken at right angles to Fig. 2.

Fig. 5 is a detail perspective view of the reflector used in connection with the lamp.

In the drawing the numeral 10 indicates the back of the rear seat of a vehicle to which is adapted to be secured the signal which comprises the essential feature of the invention and if desired, two of these signals may be employed, one for each side of the vehicle.

Each signal preferably comprises an elongated cylindrer 12 secured in a horizontal position to the back 11 in any desired manner with its outer end contiguous to the adjacent vertical side of said back. Secured intermediate the ends of the cylinder 12 is a stationary abutment 13 having a central opening 14 therein in which the slidable tubular member 15 is mounted, said member having a piston 16 at its inner end provided with an extension 17 which projects through an elongated slot 18 in the cylinder 12 so that said tubular member may slide back and forth.

A flexible element 19 has one end connected to the extension 17 and its other end arranged adjacent the driver's seat so that when a pull is exerted upon said element the tubular member 15 will be adjusted to project its outer end beyond the adjacent end of said cylinder. A coil spring 20 is interposed between the abutment 13 and piston 16 to normally retain the tubular member in its inoperative or retracted position and when said member is adjusted against the tension of said spring and the flexible element 19 afterward released said spring will return the parts to their normal positions. Adjacent the outer end of the tubular member the same is provided with an indicator 21 consisting of a stationary arm 22 having a flange 23 secured to said tubular member longitudinally thereof. A plurality of movable arms 24 are pivoted at 25 to the tubular member and are adapted to move in a vertical plane so that when the tubular member is adjusted to operative positions the outer ends of the arms will fall, by gravity, until the inner ends 25ª thereof contact the wall of the cylinder when said arms will be in a position to simulate the fingers of a hand pointing in the direction that the vehicle will travel.

The outer end of the tubular member is provided with a lamp socket 26 in which a small incandescent lamp 27 is detachably mounted. A reflector generally indicated by the numeral 28, comprises a collar 29 secured to the tubular member by a set screw 30 adjacent the lamp socket and extending from said sleeve are the oppositely disposed arms 31 to the outer ends of which is secured the reflector plate 32 which, when the signal is in its inoperative position, closes the outer end of the cylinder 12.

The means for automatically lighting the lamp 27 preferably comprises an elongated contact strip 33 secured longitudinally of the inner wall of the cylinder 12 and having interposed therebetween the insulated strip 34. A terminal 35 is carried by the cylinder and connected to the contact strip 33 and secured to said terminal is a wire 36 which leads to a suitable switch 37 in circuit with the batteries 38. A ground wire 38$^a$ leads from the battery and has an electrical connection with the cylinder 12. Carried by the tubular member 15 and insulated therefrom as shown at A is a socket 39 in which is mounted a spring pressed contact 40 adapted to engage the contact strip 33 the inner end of which is formed of insulated material as indicated at 41. The wire 42 is connected to the contact 40 and also to the lamp 27 so that when said contact is in engagement with the strip 33 the circuit will be closed and the lamp lighted. When the flexible element 19 is released and the spring 20 returns the tubular member to its inner or normal position the lamp 27 will remain lighted until the contact 40 passes the inner end of the strip 33 and engages the insulated member 41 thereof.

What is claimed is:—

A signal device of the character described, comprising a tubular cylinder, a plunger slidable in said cylinder, means for normally holding said plunger within said cylinder, a reflector plate having a bracket fixed on the outer end of the plunger and closing the cylinder when said plunger moves inwardly thereof, an electrically lighted lamp carried on the plunger to be disposed within the bracket inwardly of the reflector plate and concealed within the cylinder when closed by the latter, and means for moving the plunger outwardly of the cylinder.

In testimony whereof, I affix my signature in the presence of two witnesses.

THOMAS F. KIERNAN.

Witnesses:
T. J. CRISPIN,
J. S. McCABE.